United States Patent [19]
Meade et al.

[11] Patent Number: 5,669,969
[45] Date of Patent: *Sep. 23, 1997

[54] PROCESS FOR FORMING AGGREGATE; AND PRODUCT

[75] Inventors: William Delbert Meade, Brooklyn Park, Minn.; John William Pearson, Appleton, Wis.

[73] Assignee: Greengrove Corporation, Brooklyn Park, Minn.

[*] Notice: The term of this patent shall not extend beyond the expiration date of Pat. No. 5,500,044.

[21] Appl. No.: 550,065

[22] Filed: Oct. 30, 1995

Related U.S. Application Data

[63] Continuation of Ser. No. 138,247, Oct. 15, 1993, Pat. No. 5,500,044.

[51] Int. Cl.$^6$ .................................................. C04B 7/12
[52] U.S. Cl. .................... 106/697; 106/705; 106/708; 106/745; 106/DIG. 1; 264/333; 264/DIG. 49; 588/256; 588/257; 210/928
[58] Field of Search .................... 106/697, 705, 106/708, 745, DIG. 1; 264/49, 333; 588/256, 257; 210/928

[56] References Cited

U.S. PATENT DOCUMENTS

| | | |
|---|---|---|
| 1,895,159 | 1/1933 | Greenawalt. |
| 1,942,769 | 1/1934 | Peffer. |
| 2,948,948 | 8/1960 | Duplin, Jr.. |
| 3,030,222 | 4/1962 | Eichenlaub .................... 106/288 |
| 3,188,751 | 6/1965 | Sutton. |
| 3,600,476 | 8/1971 | Suzuki et al.. |
| 3,702,257 | 11/1972 | Konig. |
| 3,765,920 | 10/1973 | Humphrey .................... 106/DIG. 1 |
| 3,949,685 | 4/1976 | Replogle. |
| 3,973,973 | 8/1976 | Leach. |
| 4,028,130 | 6/1977 | Webster .................... 106/DIG. 1 |
| 4,081,285 | 3/1978 | Pennell .................... 106/100 |
| 4,120,738 | 10/1978 | Tate .................... 106/DIG. 1 |
| 4,208,217 | 6/1980 | Anderson .................... 106/286.2 |
| 4,210,457 | 7/1980 | Dodson .................... 106/DIG. 1 |
| 4,226,630 | 10/1980 | Styron .................... 106/DIG. 1 |
| 4,311,115 | 1/1982 | Litzinger .................... 119/1 |
| 4,340,396 | 7/1982 | Robinson-Todd .................... 106/DIG. 1 |
| 4,344,796 | 8/1982 | Minnick .................... 106/DIG. 1 |
| 4,375,986 | 3/1983 | Pichat .................... 106/DIG. 1 |

(List continued on next page.)

FOREIGN PATENT DOCUMENTS 430232 6/1991 European Pat. Off..

OTHER PUBLICATIONS

Title page and abstract, Coal Waste Artificial Reef Program, Phase 3, vol. 2: Comprehensive Report, Nov. 1981.
*Manual of Concrete Practice*, p. 213R-6, ACI-American Concrete Institute, 1990.
*NRRI Now*, Natural Resources Research Institute, Autumn 1993, pp.1 and 3.
Greengrove Corporation Grant Application dated Jul. 1991, filed with the Wisconsin Department of Natural Resources Grants Bureau Jul. 31, 1991.
Greengrove Corporation Grant Application dated 1992, filed with the Minnesota Office of Waste Management on Jan. 31, 1992.
*Minnesota Ventures*, "Cracking the Current Market", (Nov. 16, 1990).
"Production of Ceramic Product such as Artificial Lightweight Aggregate from Industrial Waste", Hayafuji, JP 02-283678. (no date available).

*Primary Examiner*—Paul Marcantoni
*Attorney, Agent, or Firm*—Merchant, Gould, Smith, Edell, Welter & Schmidt, P.A.

[57] ABSTRACT

A process for forming an ash aggregate is provided. The process involves mixing a cellulose sludge material with an ash component. The ash component may comprise fly ash or sanitary waste ash in combination with fly ash. The sludge component preferably comprises paper mill sludge or pulp mill sludge. The hard lightweight aggregate may be utilized in a variety of manners, for example, to provide lightweight concrete and lightweight concrete mixes.

19 Claims, 3 Drawing Sheets

U.S. PATENT DOCUMENTS

| | | | |
|---|---|---|---|
| 4,377,414 | 3/1983 | Buschmann . | |
| 4,402,751 | 9/1983 | Wilde . | |
| 4,432,666 | 2/1984 | Frey et al. | 405/129 |
| 4,624,711 | 11/1986 | Styron | 106/DIG. 1 |
| 4,751,887 | 6/1988 | Terry | 110/246 |
| 4,776,288 | 10/1988 | Beisswenger | 110/216 |
| 4,796,545 | 1/1989 | Hashizaki | 110/216 |
| 4,831,943 | 5/1989 | Aune | 110/346 |
| 4,890,563 | 1/1990 | White | 110/226 |
| 4,900,360 | 2/1990 | Whitescarver | 106/DIG. 1 |
| 4,902,431 | 2/1990 | Nicholson et al. | 210/751 |
| 4,947,767 | 8/1990 | Collette | 110/212 |
| 4,977,837 | 12/1990 | Roos | 110/346 |
| 4,993,331 | 2/1991 | White | 110/246 |
| 5,018,459 | 5/1991 | Judd | 110/346 |
| 5,057,009 | 10/1991 | Nechvatal et al. | 432/14 |
| 5,268,131 | 12/1993 | Harrison | 264/44 |
| 5,346,549 | 9/1994 | Johnson | 106/708 |
| 5,500,044 | 3/1996 | Meade et al. | 106/697 |

PROCESS FOR FORMING AGGREGATE; AND PRODUCT

This is a continuation of application Ser. No. 08/138,247, now U.S. Pat. No. 5,500,044 filed Oct. 15, 1993, which application is incorporated herein by reference.

FIELD OF THE INVENTION

The present invention relates to methods for treating ash material and pulp or paper mill sludge, to provide a stable aggregate. The aggregate may be used, for example, as a granular component in concrete and concrete products, as an insulating fill and as a core filler in prefabricated walls. According to the invention a unique lightweight aggregate is provided.

BACKGROUND OF THE INVENTION

Paper and pulp mill sludges are generally the dewatered sludges that come from treatment of waste water from paper and pulp processes. That is, they are the suspended solids from paper making. A principal component of such materials is cellulose fiber, generally comprising around 40–80%, by weight, of the solids content and typically a large majority of the organics, contained within the solids. Much of the remainder of the solids weight of paper pulp mill sludges comprises various minerals and clays. Paper and pulp mill sludges generally result from operations for the production of papers, tissues and cardboard.

Paper mill sludge typically contains about 45% of the cellulose fiber from the paper processing. A de-inking sludge is the resulting pulp mill sludge from a waste paper recycling operation. It comprises up to 55% cellulose fiber and other materials from the process. Especially when the sludge results from recycled paper, such as a de-inking sludge, it may also contain a substantial amount of clay or other filler. If a paper or pulp bleaching operation has been involved, the sludge may also contain some chlorines or other contaminants.

Paper mill sludges and pulp sludges have, in the past, generally been waste materials with no commercial use or value. Generally disposition of large volumes of such sludges (as are generated yearly in the U.S.) has required commitment of large amounts of landfill area, equipment and personnel, to the handling of what has been little more than a waste byproduct. Also, environmental problems are created from the disposition of such materials. Indeed, in many locations such sludges are subjected to special disposition requirements such as storage in lined or capped landfills.

Fly ash (sometimes "coal combustion fly ash") is a waste product from coal burning operations, such as coal fired boiler operations for the generation of power. Herein the term "fly ash" is meant to refer to the "light" ash which is the particulate material collected from off gases of a coal burning operation, for example in an electrostatic precipitator or bag house. Such coal ash or fly ash generally comprises a mixture of silica and alumina, with lesser amounts of other minerals. It is generated in very large amounts in this country. The volumes in which it is produced have generally well exceeded any uses to which it has been placed. Thus, it is often disposed of through waste disposal operations such as landfilling. It can in some instances contain components which are hazardous, and thus sometimes special handling techniques are required for its disposition.

Sanitary waste ash (sometimes called "municipal waste ash", "water treatment waste ash" or "SAN") is the incinerated biological solids sifted out from a water treatment operation. Such material generally comprises the result of incinerating water treatment waste solids of about 70% or less solids content. It is a coarse material, somewhat like sand, usually having a dull orange color. It is, typically, predominantly alumina and silica. It is a waste product of water treatment operations, and has generally been a source of problems for disposition. In the past it has been of little value, and has generally been disposed of as landfill.

SUMMARY OF THE INVENTION

According to the present invention a process for preparing a hardened aggregate is provided. The process generally comprises steps of preparing a raw material mixture from a paper mill or pulp mill sludge component (sometimes referred to herein as "paper/pulp mill sludge") and an ash component. The ash component can be 100%, by weight, fly ash, 100% sanitary waste ash or a mixture thereof. To advantage, additives such as binders can be avoided. However, if fly ash is used and the fly ash contains less than limiting amounts of any or all of the following: carbon; silica; alumina; or calcium oxides, then the ash component preferably includes at least 8% by weight sanitary waste ash (typically 8–18%), in order to achieve fusion during induration. Herein the term "limiting amount" in this context means an amount of each listed component sufficient to achieve fusion during induration. That is, the presence of a minimum amount of each listed component, in the ash component, has been found to be necessary to achieve fusion. While the precise limiting amount of each component may vary depending upon such factors as: temperature of fusion (induration), time of fusion, and composition of the remainder of the ash materials, in general if at least 10% by weight of the fly ash comprises each of the carbon, silica, alumina, and calcium oxide components them will be sufficient amounts of these materials for adequate fusion. However, in some instance less than 10% of various ones of the components can be tolerated.

Preferably, the raw material mixture is prepared by mixing the materials to provide for a weight ratio of paper/pulp mill sludge component to ash component (based on dry weight i.e. disregarding moisture content) within the range of about 2/1 to 4/1, preferably about 2/1 to 3/1, most preferably about 2.5/1. Preferably the raw material mixture comprises at least 66% by weight, based on a dry weight, paper/pulp mill sludge component; and, at least 20% by weight, based on a dry weight, ash component.

The process comprises a step of combustion and induration conducted on the raw material. Preferably, the induration is conducted at a temperature of at least about 1150° C. (2100° F.), to fully oxidize any organics and fuse the mineral component into a hard, useable, aggregate.

The paper/pulp mill sludge components useable in systems according to the present invention will generally (when added) have a moisture content of at least 45%, and typically 50–60%, most typically about 53–55%. The water content of the sludge component will change, of course, during the processing.

In preferred processes according to the present invention the step of mixing the raw material comprises a two-fold process of: first rough mixing; and, secondly conducting a blending by a high shear mixing. Generally, following mixing and prior to induration, the material is pelletized. Advantageously, no materials other than ash material and sludge material are needed. In particular, no additional materials such as added binders are required. To advantage, the invention can be practiced with the components comprising only waste materials.

According to the present invention, an advantageous product according to the processes described herein is provided. The product comprises lightweight aggregate useable, for example, in concrete mixes and as particulate fines in roofing tile. Preferred concrete mixes utilizing material according to the present invention are advantageous, and are also disclosed.

BRIEF DESCRIPTION OF THE DRAWINGS

FIG. 3 depicting a portion not shown in FIGS. 1 and 2.

DETAILED DESCRIPTION OF THE INVENTION

Figure 1:
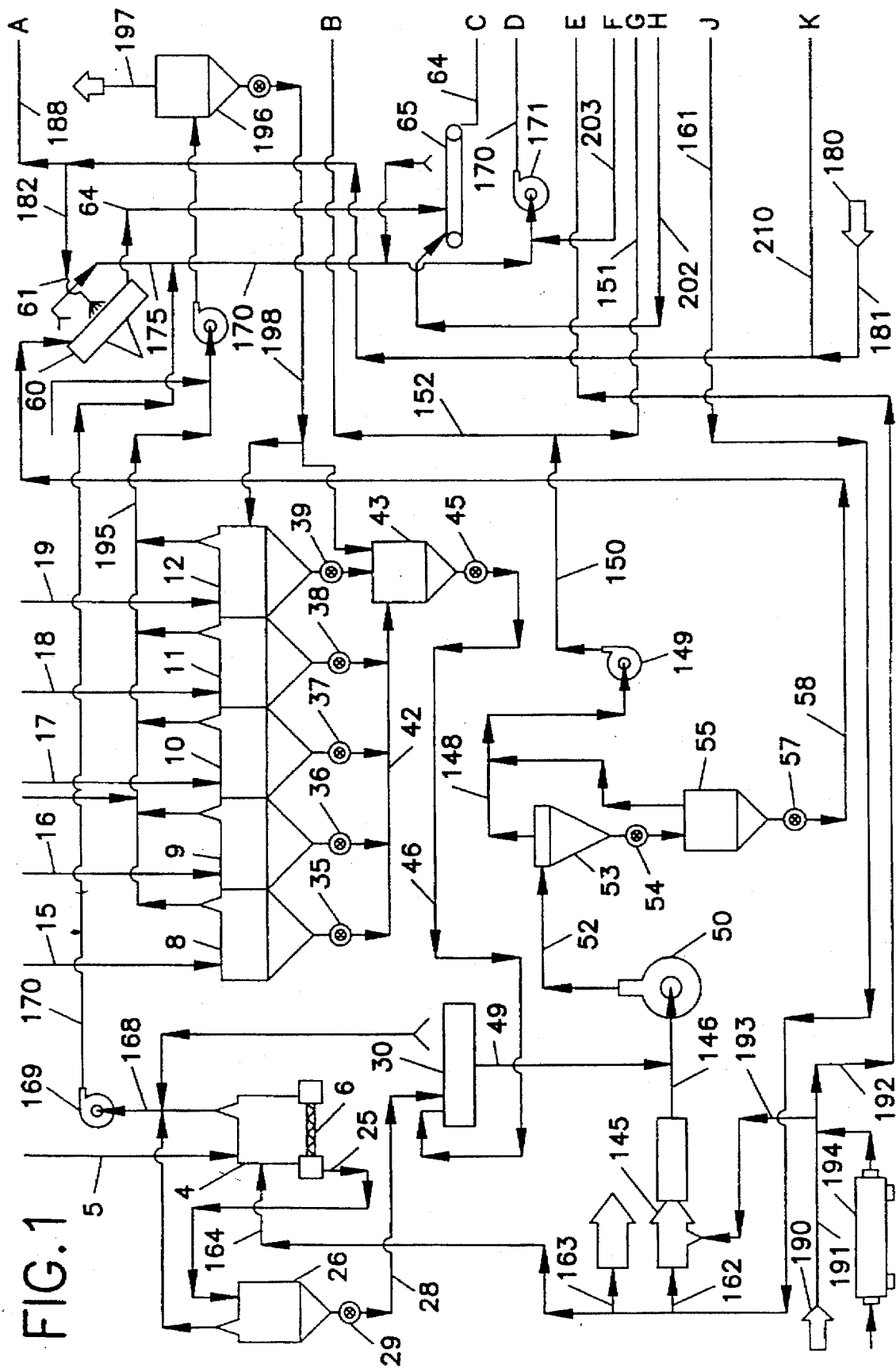
FIG. 1 is a fragmentary schematic depiction of a portion of a process according to the present invention; the portion depicted being different from the portion depicted in FIGS. 2 and 3.

According to the present invention a stable lightweight aggregate is formed from a combination of paper mill and/or pulp mill sludge and ash material. The aggregate will generally have a bulk density under 70 pounds per cubic foot, typically on the order of 45 pounds per cubic foot. It can be generated in a variety of particle sizes, for example on the order of about 1.9 cm. diameter down to about 200 mesh Tyler (0.01 cm). In fact, even very free dusts can be collected and used or recycled. The product is useful for a wide variety of applications, for example as: replacement for rock aggregate or gravel in concrete formulations; filler in prefabricated walls or concrete blocks; and, particulate aggregate in roofing file. Lightweight aggregate products according to the present invention generally conform to the standards of ASTM C-330-89 (vol. 04.02, 1991). Its color is typically a gray or light brown, but rust colors and nearly black colors can be obtained, depending upon the content of the raw materials.

Conventional lightweight aggregates have generally had a substantial clay, slate or shale component, which means that they often include large amounts of calcium materials (typically around 80% by weight) therein. Aggregates prepared according to processing described herein can be made with control of calcium content. Generally, they will be prepared with no greater than 40%, by weight, calcium oxide (on a theoretical oxides basis) therein. Typically, the calcium oxide content will be 10 to 20%, by weight, (theoretical oxides basis). Too high a calcium oxide presents results in less stable aggregates; i.e., aggregates that crumble relatively easily in concrete formulations.

In general, lightweight aggregates according to the present invention are prepared from a process of indurating a mixture of: paper mill or pulp mill sludge (paper/pulp mill sludge); and, an ash component, typically fly ash. Each of the components provides advantage, as will be understood from the following descriptions. In some instances, sanitary waste ash will be needed, as part of the ash component, to produce a desirable product.

Preferred processing according to the present invention is conducted with preferred recycling of components, preferred treatment and use of off gases, and in preferred manners for waste heat recovery. A particular, preferred, plant design for efficient utilization of materials and energy is described hereinbelow.

I. THE PRINCIPAL COMPONENTS

As indicated above, preferred processes according to the present invention use two primary components: paper/pulp mill sludge; and, ash, typically fly ash but sometimes a mixture of sanitary ash and fly ash.

A. The Sludge Component

The preferred sludge component for use in processes according to the present invention is the sludge(s) obtained from pulp mills or paper mill operations. Such materials are generally available in bulk as paper mill sludge or de-inking (pulp mill) sludge.

In general, paper mill sludges will be preferred since they do not include as high a level of clay, bleach residue or similar material therein, as de-inking sludges. However, processes according to the present invention may be practiced with de-inking sludges, as explained hereinbelow.

A typical paper mill sludge usable in processes according to the present invention will comprise about 50–55% moisture by weight. The moisture content of about 50–55% is about as low as can be readily obtained using conventional mechanical pressing, of processed cellulose fiber. Such material has the consistency of, and can be handled as, a solid. A typical such sludge exhibits about 45–75% LOI (weight loss on ignition based on a wet weight of about 54% moisture), or an LOI of about 20–35% by weight, dry. The mineral component in such sludges is generally below about 25%, typically lower than 20% (by weight based on 54% moisture content; typically 40–50%, by weight, dry). It preferably has a relatively low calcium oxide content, typically 5% by weight or lower (based on 54% moisture, 8% or less dry), and relatively low sodium oxide content, typically 8% by weight or lower (based on 54% moisture content; 16% by weight dry). The primary mineral components in such sludges are typically silica and alumina, both of which can be tolerated in relatively large amounts in processes and products according to the present invention. Silica contents on the order of about 5–10% by weight (based on 54% moisture content; 10–20% dry), and similar alumina levels, are typical. By "dry" in this context, reference is meant to the %, by weight, disregarding moisture content. The % of components stated throughout this specification are all by weight, unless otherwise stated.

Sludges usable in processes according to the present invention can be obtained directly from paper mills or de-inking operations, without further modification. De-inking sludges, including bleached by-products, clays or other materials may be used. Even aged sludge materials, which have undergone some biodegradation, can be used. Drying steps, or other modifications to the materials, are generally not needed before the materials are introduced into a process as described herein.

The following list of cellulose sludge materials and sources is indicative of the types of materials usable in processes according to the present invention:

Wisconsin Tissue Mills, Appleton, Wis. (WI Tissue Mills sludge) component analysis in Table I.

Champion Paper (papermill sludge), Lufkin, Tex. (no analysis available).

Fox River Fiber, Depere, Wis. (de-inking sludge) analysis (% by weight): Fe—0.77%; $SiO_2$—9.11%; $Al_2O_3$—7.39%; CaO—9.24%, MgO—0.34%; C—26.0%; LIO—71.44%; and $H_2O$—50.0%.

James River Fiber, Green Bay, Wis. (de-inking sludge) analysis (% by weight): Fe—0.24%; $SiO_2$—14.24%;

$Al_2O_3$—12.87%; CaO—10.10%; MgO—0.39%; C—21.14%; LOI—59.48%; $H_2O$—45.6%.

Blandin Paper Co. sludge, Grand Rapids, Mich.; analysis (% by weight-dry basis): Fe—0.60%; $SiO_2$—9.95%; $Al_3O_2$—8.38%; CaO—0.58%; MgO—0.24%; $TiO_2$—0.98%; $H_2O$—0.13%; LOI—78.16%; moisture content 73%. Contains some municipal sewage sludge (less than 2%).

Lake Superior Industries paper mill sludge, Duluth, Minn., analysis (after incineration, % by weight): Fe—0.37%; $SiO_2$—23.50%; $Al_2O_3$—18.1%; CaO—0.47%; MgO—1.10%; $TiO_2$—0.64%; $H_2O$—0.38%; $Na_2O$—0.69%; $P_2O_5$—0.06%; MnO—0.08%; S—0.04%; LOI—54.4%.

B. The Fly Ash Component

It is anticipated that processes according to the present invention will be conducted on very large scales, to process large volumes of sludge and ash. In part, this will be driven by both the present need for disposition of large volumes of such materials, and the high utility of the resulting lightweight aggregate product. Fly ash is produced in very large volumes in this country, and is useful material as the ash component. In some compositions, the ash component may comprise 100% fly ash, 100% sanitary waste ash or mixtures thereof. It is preferred, for typical use as a lightweight aggregate and concrete and the like, that the material have sufficient strength to withstand mixing, pouring, etc. If fly ash is used and it does not contain sufficient carbon, silica, alumina and calcium oxide that such a result is readily obtained from the induration, improvement in strength can generally be obtained by providing a sufficient amount of sanitary waste ash component. Again, as indicated above, if the ash component includes at least about 8% by weight (typically 8–18%) sanitary waste ash, when the fly ash alone is deficient in one of the listed components, a strong, stable aggregate is formed.

Typical fly ash materials obtained by separating particulate material from off gases of combustion process, for example with electrostatic precipitators, may be utilized in processes according to the present invention without further preparation or processing. Generally, such materials include a substantial content of alumina, silica, and in some instances, hematite.

The following list of fly ash materials and sources is indicative of the materials which may be utilized in processes according to the present invention.

Pulliam Power Co. fly ash (pulliam), Green Bay, Wis., (component analysis in Table I).

Kraft Paper Co., Green Bay, Wis., (component analysis in Table I).

Appleton Paper Ash (boiler fly ash), Combined Locks, Wis., analysis (% by weight): Fe—2.20%; $SiO_2$—38.40%; $Al_2O_3$—23.90%; CaO—2.97%; MgO—0.79%; S—0.60%; C—23.20%; LOI—26.72%; HO—1.9%.

Minnesota Power and Light Co. (MP&L fly ash), Cohasset, Minn., (no analysis available).

Northern States Power Co. (NSP fly ash), Minneapolis, St. Paul, Minn. (no analysis available).

The MP&L and NSP fly ash are believed to be of similar composition to Pulliam fly ash.

Potlatch ash from Potlatch Paper Co. of Cloquet, Minn. (Potlatch ash is a fly ash produced from incineration of coal and wet sludge); analysis: (% by weight-dry basis) Fe—0.9%; $SiO_2$—11.65%; $Al_2O_3$—9.33%; CaO—17.07%; MgO—0.51%; $TiO_2$—3.32%; $H_2O$—0.415, $Na_2O$—0.19%; $P_2O_5$—0.21%; MnO—0.02%; S—0.04%; LOI—56.62%; moisture content 53.9%.

C. The Sanitary Waste Ash Component

Sanitary ash usable in processes according to the present invention is generally that ash which is the incinerated byproduct from waste water purification. Such ash generally exhibits a relatively low LOI (10% or less) and includes as its principal components hematite (typically 12% or less), silica (typically 10–50% by weight), and alumina (typically 10–25% by weight). Typically such ash materials include some calcium and magnesium mineral component. From the following list of useful, available municipal waste ash materials, a general understanding of the types of materials that can be utilized is obtained.

Western Lake Superior Sanitary District Waste Ash (WLSSD), Duluth, Minn. (component analysis in Table I).

Green Bay Metro waste ash (G.B.M.), Green Bay, Wis.; (component analysis in Table I).

DEPERE Sanitary Disposal Waste Ash, Appleton, Wis. (component analysis in Table I).

Metropolitan Waste Control Commission, St. Paul, Minn. ("METRO ASH", Incinerated Human Waste and Biosolids), component analysis as follows (% is % dry weight; P&F= ash from plate and frame presses; RP=ash from roll on previous page press; either P&F or RP could be used).

| ELEMENTAL ANALYSIS OF METRO ASH - % DRY WEIGHT (2) | | |
|---|---|---|
| Constituent | P & F Ash (2) | R P Ash (3) |
| Fluorine | 0.017 | 0.032 |
| Chlorine | 0.145 | 0.150 |
| Sulfur | 0.230 | 0.180 |
| Phosphorus | 8.12 | 4.37 |
| Silicon | 18.0 | 28.0 |
| Carbon | 0.55 | 0.75 |
| Hydrogen | 0.17 | 0.04 |
| Nitrogen | 0.048 | 0.050 |
| Oxygen | 43.52 | 36.16 |
| Copper | 0.650 | 0.360 |
| Nickel | 0.082 | 0.052 |
| Lead | 0.095 | 0.087 |
| Zinc | 0.520 | 0.390 |
| Cadmium | 0.006 | 0.002 |
| Chromium | 0.285 | 0.210 |
| Potassium | 0.490 | 0.490 |
| Iron | 4.20 | 2.90 |
| Calcium | 8.80 | 8.20 |
| Aluminum | 6.50 | 5.50 |
| Manganese | 0.210 | 0.085 |
| Magnesium | 1.50 | 1.08 |
| Sodium | 0.240 | 0.330 |
| Barium | 0.625 | 0.450 |
| Beryllium | 0.00013 | 0.00009 |
| Silver | 0.039 | 0.016 |
| Selenium | 0.00018 | 0.00019 |
| Antimony | 0.014 | 0.013 |
| TOTAL | 95.056 | 89.897 |

II. PROCESSING OF THE COMPONENTS TO FORM THE LIGHTWEIGHT AGGREGATE

In general, processes according to the present invention include the following steps: a rough mixing of the sludge component with the ash component; homogeneous blending; pelletization; combustion and induration.

A. The Rough Mixing of Raw Materials

Any of a variety of means may be utilized to provide initial mixing of the sludge component with the ash components to form a raw material mixture. In general, for a continuous feed system, it is foreseen that each component will be metered from its storage bin, continuously, into a continuous feed mixer such as a pug mill.

The components should be mixed such that a theoretical weight ratio (based on a theoretical dry sludge/ash weight ratio) preferably within the range of 2/1 to 4/1 more preferably about 2/1 to 3/1 and most preferably about 2.5/1 is obtained. In general, the sludge will have about a 55% moisture content, and the ash will be provided essentially dry. Thus, typically (and most preferably) the weight ratio of components mixed will be about 5.5/1 (including moisture content).

In general, the stage of rough mixing will be conducted such that the materials are well mixed, but not blended. In a pug mill, for example, the materials are forced through a trough in which they encounter rotating mixing paddles that mix and direct the material on through the system. Such a system is an effective way of mixing high viscosity materials. The consistency of the material as it passes through the pug mill is generally very heavy, somewhat like moist dirt; the mixture containing about 45% moisture by weight.

The mixing step can be conducted at ambient. Thus, the temperature at which the step is conducted will vary depending upon the climate and weather conditions. It is foreseen that if the temperature is much below about 0° C., water within the paper mill sludge will freeze. Under such situations, heat may be applied to the storage bins to inhibit freezing.

It is foreseen that in many applications, the ash component will comprise a blend of ash materials obtained from various sources. In such applications, the ash material may be individually fed from feed bins, using appropriate metering devices. The ash blends are preferably selected such that S consistently high quality aggregates are produced by providing the calcium oxide, carbon, silica and alumina presence previously discussed.

B. Homogeneous Mixing

After the step of initial rough mixing, the solid mixture is directed throughout an homogeneous mixing process. In general, in the mixing process the mixture is subjected to high speed (high shear) mixing. In the process, the water content will typically and preferably be reduced, preferably from about 45% by weight to no more than about 35% by weight. This reduction of water content is conducted to facilitate follow-up pelletization.

While various equipment may be utilized for conduct of the homogeneous mixing in general it is foreseen that the process will be conducted on a continuous flow through basis with application of heat. Equipment that is particularly well adapted for this use is available under the trade name Atritor from Atritor, parent company Rosen Engineering Co., Ltd. of Coventry, England. The Atritor products are distributed in the U.S. by Kennedy Van Saun Corp., Danville, Pa.

During the conduct of the homogeneous mixing, using the Atritor machinery, the solid material is fed into a set of spinning teeth, and is subjected to high shear. A stream of hot gas, typically at an inlet temperature of 250°–350° C. typically about 275° C., is directed through the system. This not only improves the flow characteristics of the material, but leads to a reduction of moisture content from about 45% to no more than about 35% by weight. The precise temperature and flow rate of the hot gas, as well as flow rate of solids through the system should be selected to achieve the desired reduction in moisture content; i.e., down to no more than about 35%.

The homogeneous mixing, if done as described, is preferably conducted such that the material exiting the process does not have a moisture content of much greater than about 35% by weight, or it will not pelletize well. Also, it need not be conducted such that the material has a moisture content of lower than about 30% by weight, or energy well have been wasted in drying, since a water spray is added during the step of pelletization.

The material exiting the mixing process will generally have a consistency of a wet fibrous material, such as wet cotton. Such material can be readily pelletized, using conventional techniques.

C. Pelletization

Prior to induration, the blended mixture is pelletized. A variety of conventional techniques may be utilized for pelletization. For operation of the process on a continuous flow through basis, a disc pelletizer such as the FEECO Pelletizing Disc available from FEECO INTERNATIONAL. Other pelletizer manufacturers include FERROTECH, Wyandotte, Mich.; Allis Materials Systems, Waukesha, Wis.; HMC, Mars, Pa.; and Teledyne-Readco, York, Pa.

In general, pelletization will be conducted to generate "green balls" or "wet pellets" typically and preferably within the size range of about 1 inch (2.5 cm) to 50 mesh Tyler (0.05 cm), depending upon the particular size or grade of product desired. In general, during the follow-up induration process, the size of the pellets will reduce by as much as 50%. Thus, the pelletizer can be used to control the grade or size of material to some extent. However, following induration crushing and/or sizing may also be used to select particular grades of material.

The FEECO pelletizer mentioned is a disc pelletizer. Disc pelletizers are particularly desirable for use in processes according to the present invention. During pelletization, typically water content is raised to about 41–46% by weight, by addition of a water spray, to facilitate the process.

One advantage to using disc pelletization is that the material is formed in round balls. This is advantageous, since following induration a round aggregate will be formed (assuming no follow-up crushing). Round aggregates are somewhat stronger than alternative shapes; and if the material is utilized in concrete mixes or the like, a round aggregate will provide for a concrete mixture having improved or preferred flow characteristics and a lower bulk density.

D. Combustion and Induration

After pelletization, the material is directed to a combustion and induration process. In general, during the process the pellets are heated in an atmosphere of at least about 1150° C. (2100° F.), typically within the range of about 1090°–1315° C., to provide for oxidation of the organics and fusing of the material into a hard aggregate. The combustion provides that the product will be lightweight, and that decomposable organics are removed.

It is foreseen that in a typical application, the pellets will be passed through a kiln having an oxidizing atmosphere and a maximum temperature of about 1260° C., for a period of at least about 45 min. 1 hr. This will, in general, be sufficient to provide for oxidation of at least 99% of the organics, and to form a desirable aggregate. In continuous flow processes according to the present invention, induration can be conducted in a rotary kiln fired at the front end, rotating (typically) at about 0.5–4 rev./min.

Following induration, the aggregate (pellet(s)) is cooled, for example, in a rotary cooler or tumbler. It is then sized (and if desired crushed) and stored for various uses. Fines may be recycled, for example, by introduction back into the attrition process.

Because the green pellets from the disc pelletization step include a substantial carbon content, the material will burn in the induration process. As a result, the material gives off heat during induration, and hot gases resulting therefrom will be transferred out of the kiln. Thus, the green pellets may be utilized as a fuel source for a cogeneration process. A preferred arrangement for taking advantage of this is described hereinbelow.

Because the organic content (and indeed the entire chemical content) of the green pellets can be readily closely controlled in formulations according to the present invention, good control of the kiln process results, and little kiln fluctuation temperature will result. Thus, not only is a high quality fused product from the induration process obtained, but a cogeneration process can be conducted efficiently and effectively.

E. Secondary Combustion of Off Gases from Induration (Optional)

In some processes according to the present invention, volatiles or off gases from the induration process will be directed through a secondary combustor. The secondary combustor may be used, for example, to insure that any volatile component is fully decomposed. Conventional techniques and arrangements for the secondary combustion may be utilized. Residence times for gases in the secondary combustion chamber should be sufficient to achieve 99.99+% decomposition. The residence time should also be at least 2 sec. in excess of about 982° C. (1800° F.), to meet government standards. Generally residence times on the order of 12–35 sec. are sufficient to achieve this.

III. A PRODUCTION PLAN FOR CONDUCT OF THE PROCESS ON A CONTINUOUS BASIS

Conduct of the above-described process on a large scale, continuous flow, industrial basis will be understood from the following descriptions taken in connection with the accompanying drawings. The description is intended to be exemplary only, and should not be understood as limiting. The process may be applied in a variety of arrangements, utilizing either continuous flow or batch processing methods. However, the details disclosed in the proposed example do indicate a particular preferred, efficient, unique and advantageous method of processing on a continuous flow through basis.

Figure 2:
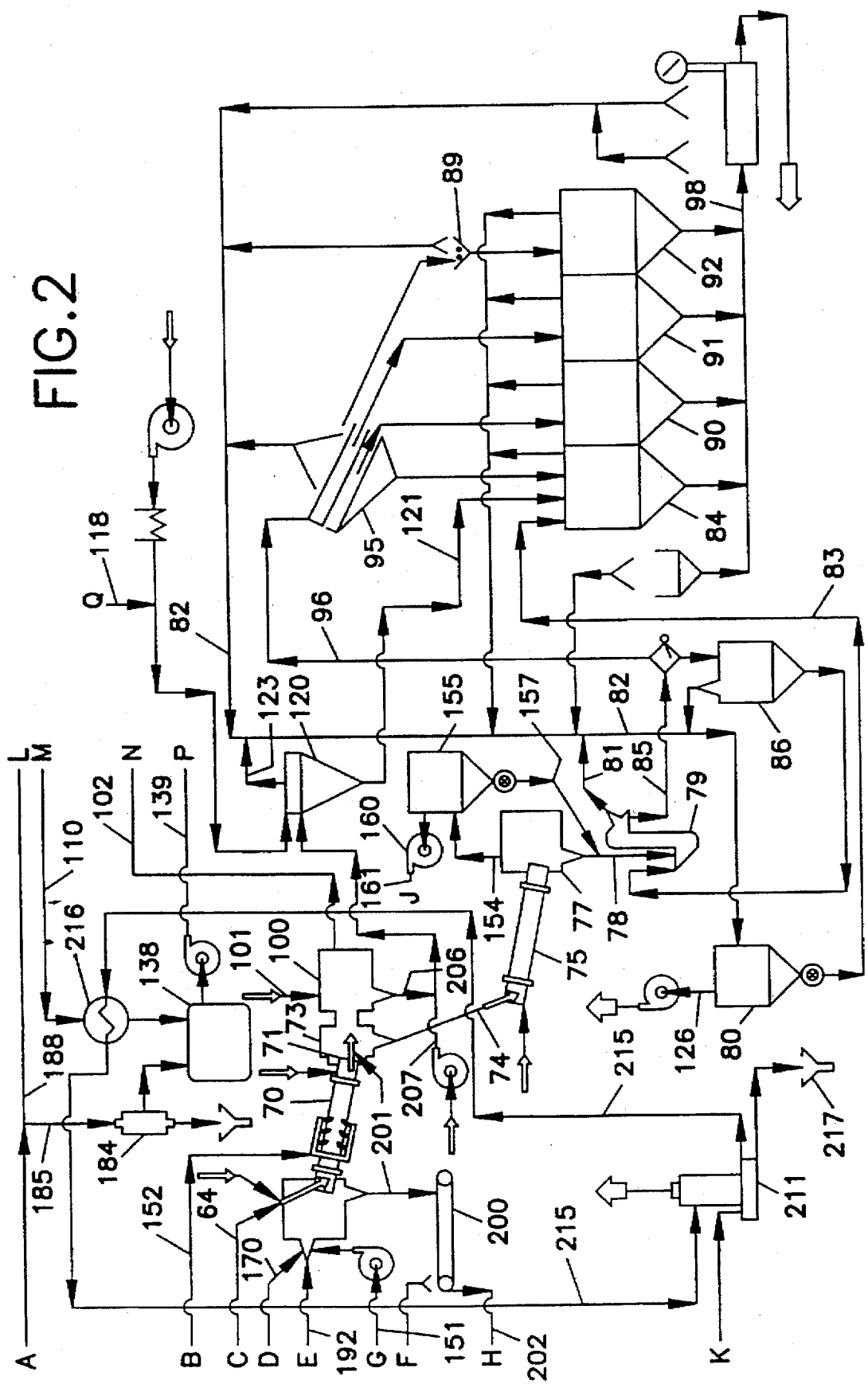
FIG. 2 is a fragmentary schematic depiction of a different portion of a process according to the present invention from a portion depicted in FIGS. 1 and 3.
Figure 3:
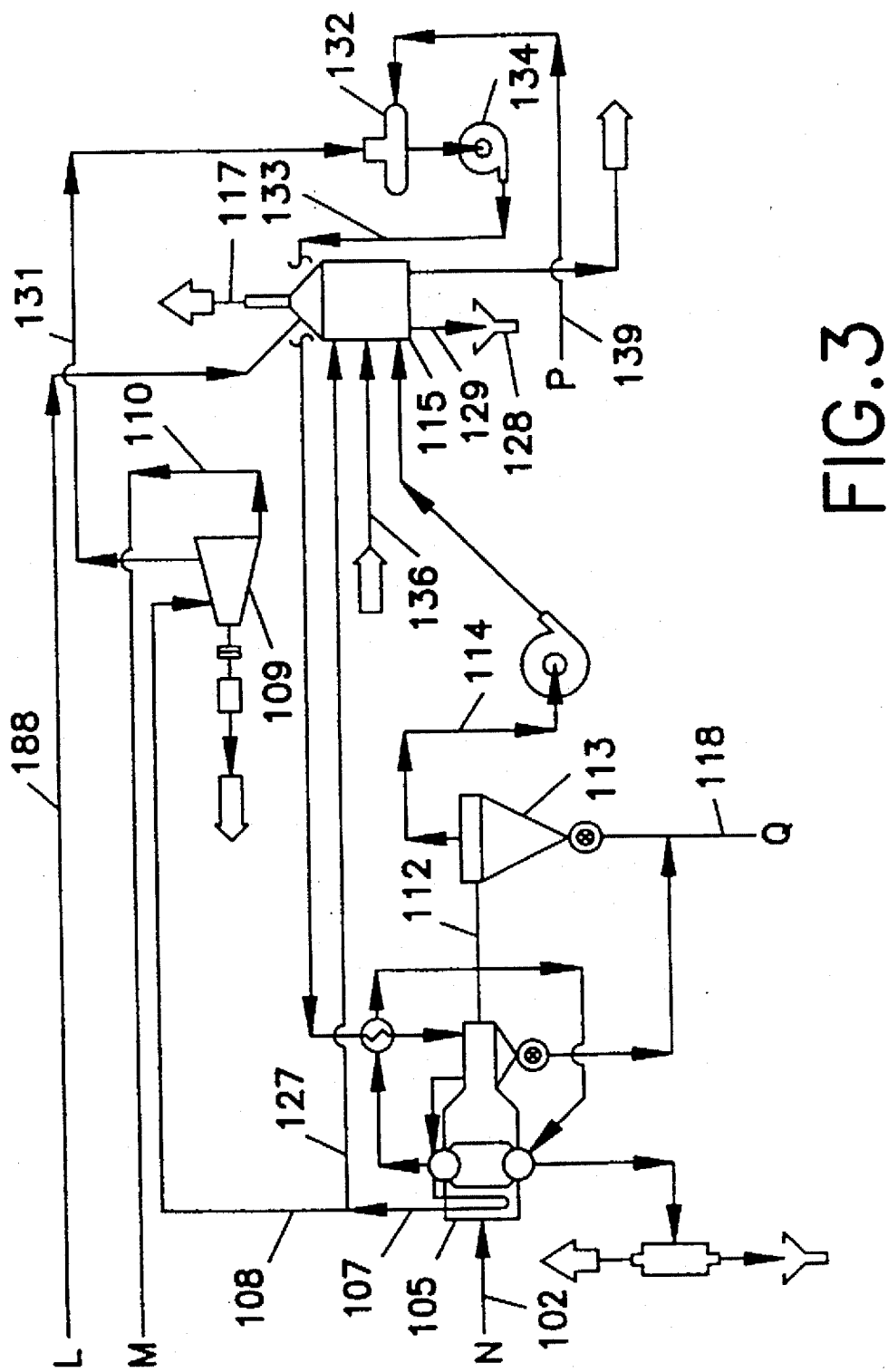
FIG. 3 is a fragmentary schematic depiction of a portion of the process according to FIGS. 1 and 2.

FIGS. 1, 2 and 3 reflect a plan for conduct of a process according to the present invention on a continuous flow through basis. In FIG. 1, the steps of rough mixing, attrition and pelletization are shown. In FIG. 2, the steps of induration, cooling and product storage are illustrated. In FIG. 3, a process of cogeneration is illustrated.

Throughout the figures, pumps are illustrated with a standard symbol therefor (see for example pump 149). It is will be understood that the pump locations may be varied, depending upon particular, specific, configurations in systems used. Also, throughout the figures off gases are shown through particulate removal systems such as bag houses, precipitators and cyclonic separators. It will be understood that although specific arrangements may be illustrated, for example a cyclone separator in a particular given situation, alternate arrangements may be utilized.

Referring to FIG. 1, cellulose sludge (paper/pulp mill sludge) is shown directed from receiving trucks, railroad cars or some storage location into hopper 4 via line 5. Hopper 4 is a live bottom hopper with a screw feeder 6 for directing the cellulose sludge further in the process.

The process described in FIGS. 1 and 2 will be illustrated conducted with a mixture of ash materials. For the particular process illustrated, a blend of five ash materials, two from coal combustion processes and three from water treatment facilities (sometimes referred to as sanitary ash) are used. Five ash bins are located at 8, 9, 10, 11, and 12, fed from lines 15, 16, 17, 18, and 19, respectively.

As described above, in a first stage of the process, the ash material is mixed with a cellulose material, in a rough mixing operation, typically conducted in a pug mill or the like. Referring to FIG. 1, cellulose sludge material is directed from the live bottom hopper via line 25 to surge bin 26. From the surge bin it is metered through line 28 by meter 29 to the pug mill 30.

Ash material from ash bins 8, 9, 10, 11, and 12, is metered from each bin as indicated at metering feeders 35, 36, 37, 38, and 39, respectively, (sometimes via line 42) into ash surge bin 43. From ash surge bin 43 the mixture of ash material is metered by metering mechanism 45 through line 46 into pug mill 30.

In pug mill 30, the cellulose sludge material is mixed with the ash material. The solid mixture exits pug mill 30 through line 49, by which it is directed into attritor 50.

In attritor 50, the mixture is homogenously mixed, by high shear mixing (with some reduction in moisture content, typically down to about 35%, as described above). The solid, still moist, material exits attritor 50 via line 52 and is directed into cyclone 53. In cyclone 53 the solid product stream from attritor 50 is separated from hot gases therein. The solid product stream is metered from cyclone 53 by control 54 into surge bin 55.

From surge bin 55, the mixed material is metered via control 57 through line 58 into a disk pelletizer 60. In the disk pelletizer 60, water is added via line 61 to facilitate the process. The green balls or pelletized material are removed from the disk pelletizer via line 64, by which they are directed by feed conveyor 65 to the induration process, FIG. 2. (In FIG. 1, line 64 is fragmented at C; also, in FIG. 2, line 64 is shown resuming at C.)

Referring now to FIG. 2, at line 64 particulate input from the disk pelletizer is shown directed into rotary kiln 70. In rotary kiln 70, the combustion and induration process is conducted. The products are discharged at 71 into hood 73. The solid discharge is directed from the bottom of hood 73 via line 74 into rotary cooler 75. The solid discharge from rotary cooler 75 is directed into hood 77. The solids are then fed via line 78 into product elevator 79. Airborne dust is directed into product bag house 80, via lines 81 and 82. From the product bag house 80, the material is directed, as shown by line 83, into product storage bin 84.

Heavier product from elevator 79 can be directed through line 85. In the arrangement shown in FIG. 2, a plurality of product bins 84, 90, 91, and 92 are shown. It is anticipated that the product will be sized, using various screen operations. The product may then be graded and sold for various uses. Separation can be conducted by directing material from the product elevator 79 into separator/sizer 95 as shown in lines 85 and 96. If desired, the largest aggregate separated in sizer 95 can be directed into crusher 89 before classification. Bin 86 is bypass to permit maintenance.

In FIG. 2, product is shown directed from product bins 83, 90, 91, and 92, at line 98.

Steam Production

Processes according to the present invention can be rendered more cost effective and energy efficient if they are utilized in association with steam generation or steam production. The steam generated from heat recovery may be sold as an industrial steam or for wide variety of uses, or it may be utilized as part of cogeneration. In the figures illustrated, steam production from heat recovery is illustrated. In the particular embodiment disclosed, steam production is utilized as part of a cogeneration (production of electrical energy).

Still referring to FIG. 2, attention is again directed to rotary kiln 70. Previously, solid discharge was shown directed from rotary kiln 70 into discharge hood 73, and outwardly therefrom through solids discharge line 74. It will be understood that hot off gases, typically on the order of about 1150° C. (2100° F.), will also be directed out of rotary kiln 70. In part these result because the solids in kiln 70 have an energy valve; i.e. during induration they combust. In FIG. 2, the hot gases are shown directed into secondary combustion chamber 100. In secondary combustion chamber 100 sufficient oxygen, air leakage or controlled air injection is provided via line 101 to ensure that the volatiles within combustion chamber 100 are fully decomposed. In this way, any remaining halocarbons or other environmentally undesirable organics can be rendered environmentally acceptable. Gaseous discharge from the secondary combustion chamber 100 is shown in line 102. Via line 102, the hot off gases are directed into a heat exchange apparatus 105, FIG. 3, for generation of steam. Termination of line 102 in FIGS. 2 and 3 is shown at N. An arrangement such as an HRSG (Heat Recovery Steam Generator) may be utilized, for example, for the waste heat recovery system 105.

Referring to FIG. 3, steam, generated in line 107, is shown directed in line 108 to drive steam to turbine 109 for generation of power. The exit line for turbine exhaust is indicated at line 110.

Referring again to the heat exchanger 105, FIG. 3, gases which enter at line 102 are shown exiting at line 112. The gases are then directed into a particulate removal system or device, such as a bag house precipitator or separator for removal of particulates. In the figure, the gases are shown directed into cyclone separator 113 for removal of particulates therefrom. The gas is then discharged via line 114 through scrubber 115; the exit to the atmosphere being indicated at 117.

Particulates removed from cyclone 113 are collected and directed through line 118, FIG. 3, to a particulate removed system, for example cyclone separator 120, FIG. 2. (Termination of line 118 in FIGS. 2 and 3 being shown at Q.) The particulates are directed to bin 84 for fines, as indicated at line 121. The gases separated in cyclone 120 are directed, as indicated at lines 123 and 82, to bag house 80. The dust from bag house 80 is directed into the fines bin 84 at line 83; and, the gases from bag house 80 are directed to the environment, as indicated at line 126.

Referring again to FIG. 3, steam from line 107 is directed via line 127 to provide hot steam for operation of the scrubber system 115. Water collected from scrubber system 115 is shown directed to sewer 128 at line 129.

The turbine extraction is shown directed at line 131 to deaerator 132, and then back into the heat exchanger 105 at line 133. Circulation is facilitated by pump 134.

Absorbent feed to the scrubber system is shown at line 136.

The reject stream is shown directed from line 110 to condensate tank 138, FIG. 2. (Line 110 being shown fragmented in FIGS. 2 and 3 at M.) The condensate from tank 138 can be recirculated via line 139 into de-aerator 132 (FIG. 3) and via line 133 (FIG. 3), back into heat exchanger 105. (Line 139 is fragmented in FIGS. 2 and 3 at P.)

Referring again to FIG. 1, attritor 50 was described as operating with a hot gas flowing therethrough to reduce moisture content in the solids down to around 35%. An air heater (burner) to achieve this is indicated at 145. In general, the air heater should be a burner that can generate a hot gas steam, for example from combustion of natural gas, coal or other fuel, on the order of about 350° C. Hot gas inlet to the attritor 50 is indicated generally at line 146.

From the attritor 50, the hot gases will leave, along with solids, along line 52 to cyclone 53. Within cyclone 53, the solids are separated as described above. The off gases are directed outwardly from the cyclone 53 as shown at line 148. In combination with fan 149, the gases are directed via line 150 through line 151 to serve as secondary combustion air in rotary kiln 70; and, via line 152 to serve as a fuel source for the rotary kiln 70. (Line 151 is shown in FIGS. 2 and 3 as fragmented at G. Line 152 is shown in FIGS. 2 and 3 as fragmented at B.)

Referring again to FIG. 2, hot off gases from the rotary cooler 75 are shown directed outwardly from hood 77 via line 154 to bag house 155. Particulates separated in the bag house 155 are directed via line 157 to line 78, and ultimately product elevator 79. Off gases from bag house 155 are directed via fan 160 at line 161 to be used in an efficient manner, for example as air directed into air heater 145 via line 162, FIG. 1, as air to be used for building heat, line 163, FIG. 1, and as air to keep the moist cellulose sludge in hopper 4 sufficiently warm, for example, in the winter, via line 164, FIG. 1. (Line 161 is shown fragmented in FIGS. 1 and 2 at J.)

Referring to FIG. 1, the air from hopper 4 is shown directed via line 168 and fan 169, to line 170 and fan 171, whereby it is directed as primary combustion air into the rotary kiln 70. (Line 170 is shown fragmented in FIGS. 1 and at D)

Referring again to FIG. 1, hot off gases from disc pelletizer 60 are shown directed via line 175 into line 170, fan 171, and ultimately rotary kiln 70 as primary combustion air.

Referring to FIG. 1, water feed into the system is shown at source 180 and line 181. The water feed is directed to the pelletizer 60 at spur 182; through water conditioner 184, FIG. 2, via line 188 and spur 185; and ultimately to condensate storage tank 138; and via line 188, FIG. 2, to the scrubber system 115, FIG. 3. (In FIGS. 1 and 2 line 188 is shown fragmented at A. Between FIGS. 2 and 3 line 188 is fragmented at L.)

A natural gas source is shown at 190, FIG. 1. The natural gas is directed via line 191 to a variety of locations, including: air heater 145.(via spur 193) and to rotary kiln 70 via line 192. In the particular arrangement shown, a standby fuel source is indicated at 194, as a propane storage tank. (In FIGS. 1 and 2, line 192 is shown fragmented at E.)

Referring to FIG. 1, it will be understood that air will be passed into the ash bins 8, 9, 10, 11, and 12, along with the fly ash transferred thereto. Air with dust in it, from the ash bins 8, 9, 10, 11, and 12, is passed via line 195 into the ash system bag house 196. The cleaned air is discharged to the atmosphere via line 197. The particulates are collected in the bag house 196 and are directed via line 198 into bin 43 or bin 12, as desired.

Referring to FIG. 2, a back spill conveyor 200 is provided to receive particulate material via line 201 from an entrance end of rotary kiln 70. Any particulate material which is not fed through rotary kiln 70, but rather is part of back spill, will be directed by back spill conveyor 200 via line 202, back to feed conveyor 65, FIG. 1, for recirculation. (Line 202 is fragmented in FIGS. 1 and 2 at H.) Air flow is directed from the back spill conveyor 200 via line 203 to hot gas line 170 for recirculation.

Referring again to FIG. 2, particulates separated in secondary combustion chamber 100 are directed via line 206, with air flow from line 207, into cyclone 120.

Some water flow from line 181, FIG. 1, is shown directed via spur 210 into cooling tower 211, FIG. 2, from which it is circulated via line 215 through heat exchanger 216, back to cooling tower 211 (or to lake or river cooling water), and to the sewer, at 217. (In FIGS. 2 and 3 line 210 is shown fragmented at K.) In heat exchanger 216, the cooled water in line 215 is used to cool steam/water in line 110 from turbine 109, FIG. 3, as it is directed into condensate storage tank 138.

Operating Parameters for a Proposed Example

The following description will indicate how a facility designed generally according to the description given above with respect to FIGS. 1, 2 and 3 can be operated to produced lightweight aggregate according to the present invention. The information provided is exemplary only. That is, it provides an indication of how the process can be conducted, in a preferred and efficient manner, and provides a basis for understanding the invention generally.

Assume a system in which lightweight aggregate is to be produced at a dry weight of about 19,456 pounds per hour. The aggregate will be generally characterized below.

For such a process, the following raw material could be used: paper mill sludge (feed at 57,226 pounds per hour wet or 25,752 pounds per hour dry weight). The source of the coal combustion fly ash would be two fold: Pulliam fly ash (from Pulliam Power Co., Green Bay, Wis.) and Kraft fly ash (from Kraft Paper Co., Green Bay, Wis.). The compositions of these fly ashes are described hereinbelow. The feed with respect to them is as follows: Pulliam fly ash—2,575 pounds per hour (dry); Kraft fly ash 4,566 pounds per hour (dry).

The feed of the sanitary waste ash, or water treatment waste ash, is from three sources: G.B. Metro, (i.e., Green Bay Metropolitan Sanitary District, Green Bay, Wis.); DePere Metro (i.e., DePere Waste Water Treatment Plant, DePere, Wis.); and WLSSD (i.e. Western Lake Superior Sanitary District, Duluth, MN). The particular compositions of these materials are described below. The feeds into the system are as follows: G.B. Metro, 834 pounds per hour (dry); DePere Metro, 611 pounds per hour (dry); and WLSSD, 1715 pounds per hour (dry).

It is anticipated that for such a system the attritor product fed into the disc pelletizer will be at a rate of about 56,322 pounds per hour (wet weight). The material from the disc pelletizer will be fed into the kiln at a rate of about 62,700 pounds per hour (wet weight). The kiln product (lightweight aggregate) will be generated at a rate of about 19,456 pounds per hour.

From the kiln, the combustion gases would be produced at a rate of about 226,184 pounds per hour (wet).

The various amounts of gases, water, temperatures, etc. could be adjusted, or calculated, appropriately for the above process parameters.

For the example described the composition of the input sludge, Pulliam fly ash, Kraft fly ash, G.B. Metro sanitary waste ash, DePere Metro sanitary waste ash and WLSSD sanitary waste ash are shown in Table I.

TABLE I

COMPONENT ANALYSIS - All numbers are % by weight.

| | PAPER SLUDGE WI TISSUE MILLS | | COAL F. BOILER ASH | | SANITARY WASTE ASH | | |
|---|---|---|---|---|---|---|---|
| | DRY | WET | PULLIAM | KRAFT | G.B.M. | DEPERE | WLSSD |
| MOISTURE | — | 54.00 | — | — | — | — | — |
| $Fe_2O_3$ | 0.29 | 0.13 | 15.08 | 2.46 | 10.93 | 6.04 | 3.43 |
| $SiO_2$ | 18.90 | 8.70 | 46.79 | 13.34 | 29.27 | 14.18 | 47.93 |
| $Al_2O_3$ | 15.11 | 6.95 | 22.82 | 8.20 | 15.98 | 12.37 | 23.48 |
| CaO | 7.45 | 3.43 | 1.32 | 31.55 | 12.82 | 40.17 | 8.56 |
| MgO | 0.50 | 0.23 | 0.67 | 4.99 | 3.38 | 2.90 | 2.25 |
| LOI | 53.24 | 24.49 | 6.20 | 25.11 | 3.76 | 8.97 | 0.68 |
| SUBTOTAL | 95.50 | 43.93 | 92.87 | 85.64 | 76.13 | 84.63 | 96.32 |
| OTHER | 4.50 | 2.07 | 7.14 | 14.37 | 23.88 | 15.37 | 13.69 |
| TOTAL | 100.00 | 100.00 | 100.00 | 100.00 | 100.00 | 100.00 | 100.00 |
| CARBON | 19.83 | 9.12 | 5.15 | 15.35 | 0.57 | 1.00 | 0.22 |

An Example of a Product Prepared According to the Present Invention

Twenty tons of the product were produced in a pilot plant operation. The raw materials utilized to form the lightweight aggregate product were as described above in the hypothetical example for a continuous plant operation. The relative amounts of the components were the same as described, as well.

The loose packed bulk density of the lightweight aggregate was 50 per cubic foot (pcf). Its compressive strength (⅜ inch pellets) was 22.5 pounds. It contained 0.6% clay lumps and friable particles. Its organic impurities level was less than plate 1 (according to 1991 ASTM (volume 04.02) designation C 330-89, for lightweight aggregates). Its loss on ignition was 0.005%.

The product had a straining rating of "None" when tested according to ASTM: 0648. TCLP testing (testing regulated by the EPA) passed drinking water requirements under FFA SW—846.

Concrete Mixes Utilizing the Lightweight Aggregate

The product can be utilized to produce a lightweight concrete mix. This is advantageous, since there will be less weight, for a given volume of concrete mix; the deadload in structures formed from the concrete will be less; and, the placement of the concrete will generally be easier for workers and for larger loads of mix. For example, the weight of a shipping package or container of concrete can be reduced from about 165 pounds to 115 pounds per cubic foot, using lightweight aggregate according to the present invention. A similar (proportion) reduction in weight will be obtained in the resulting concrete.

In general, the lightweight aggregate replaces the rock aggregate (gravel) in the concrete formulation. The other ingredients of the concrete formulation will be conventional ingredients such as sand, water and cement mix.

In a typical concrete formulation, about 60% by weight is rock aggregate (gravel). Since the lightweight aggregate according to the present invention is lighter than gravel, a lower percent of the concrete mix will generally comprise the lightweight aggregate, typically on the order of about 15 to 30%.

The strength of the concrete utilized in the lightweight aggregate is comparable to concrete using gravel. However, concrete mixes made with lightweight aggregate according to the present invention will generally absorb more water during setting. This propensity should be accommodated in the formulation of mix/water in preparing the concrete. Generally, formulations in which all of the rock aggregate has been replaced with lightweight aggregate according to the present invention will absorb about 12–14% more water, by weight. Thus, when the concrete mix is prepared for pouring, with water, about 12–14% more water Coy weight) will be used than in a conventional mix.

A concrete mix using lightweight aggregate as described above was prepared according to the following formulation the percent being given by weight:

Type I cement (conventional portland cement): 17–22% of solids content
Type C fly ash: 0–3% (replace cement)
Fine sand aggregate: 46–51%
Lightweight aggregate prepared according to the processes described herein: 19–24%
Water: 8–10%

The result was a material having: an air content of 4.5%–8.5%; slump 3–4.5 inches (7.6–1.4 cm), strength (28 day) 3600–4700 psi (pounds per square inch); gradation 3/8 inch by #8; admix: ASTM C494 type A (water reduce) 20–24 oz; ASTM: C260 (air entrain) 2.5–4 oz. The unit weight of the set concrete (28 days) was 110 pounds per cubic foot.

An advantage to Applicant's process is that it can, if desired, be conducted completely with waste products and no additives. That is, the advantageous product can be prepared utilizing only waste products, with no additives provided thereto. As a result, it can be utilized to reduce landfill and economically handle disposition of waste materials to advantage. It is noted that the process provides a fused material from which undesirable components do not readily leach. For example, fly ash occasionally includes arsenic therein. While such a material may be leachable from the ash, it is not leachable as readily from the resulting aggregate.

What is claimed is:

1. A process for preparing a hardened aggregate; said process comprising the steps of:
   (a) mixing a raw material mixture including a paper/pulp mill sludge component and an ash component;
      (i) said raw material mixture comprising at least 66% by weight, based on dry weight, paper/pulp mill sludge component; and at least 20%, by weight, based on dry weight, ash component; a ratio of dry weight sludge to ash component being within a range of 2/1 to 4/1; said sludge component being selected from the group consisting essentially of pulp mill sludge, paper mill sludge and mixtures thereof;
      (ii) said ash component comprising at least 82%, by weight, fly ash; and
   (b) indurating said raw material mixture.

2. A process according to claim 1 wherein:
   (a) said sludge component when added to said raw material mixture a moisture content of at least 50%.
3. A process according to claim 2 wherein:
   (a) said sludge component comprises paper mill sludge.
4. A process according to claim 2 wherein:
   (a) said sludge component comprises de-inking sludge.
5. A process according to claim 1 wherein:
   (a) said ash component comprises 100%, by weight, fly ash.
6. A process according to claim 1 wherein:
   (a) said ash component comprises at least 8%, by weight, sanitary waste ash.
7. A process according to claim 1 wherein:
   (a) said step of indurating said raw material mixture comprises a step of firing said mixture by passage through a kiln having a maximum temperature of at least 1090° C.
8. A process according to claim 1 including:
   (a) a step of pelletizing, prior to said step of indurating said raw material mixture to form pellets of raw material mixture containing at least 35%, by weight, water; and
   (b) wherein said step of indurating comprises indurating said pellets.
9. A process according to claim 8 wherein:
   (a) said step of indurating said raw material mixture comprises a step of firing said mixture by passage through a kiln having a maximum temperature of at least 1090° C.
10. A process according to claim 9 wherein:
    (a) said ash component comprises 100%, by weight, fly ash.
11. A product made according to the process of claim 1.
12. An aggregate comprising:
    (a) a product of heating, at a temperature of at least 1090° C. in an oxidizing atmosphere, a raw material mixture including a paper/pulp mill sludge component and an ash component;
       (i) said raw material mixture comprising at least 66% by weight, based on dry weight, paper/pulp mill sludge component; and at least 20%, by weight, based on dry weight, ash component; a ratio of dry weight sludge to ash component being within a range of 2/1 to 4/1;
       (ii) said ash component comprising at least 82%, by weight, fly ash.
13. An aggregate according to claim 12 wherein:
    (a) said sludge component comprises paper mill sludge.
14. An aggregate according to claim 13 wherein:
    (a) said sludge component results from a sludge having a moisture content of at least 50%.
15. An aggregate according to claim 12 wherein said ash component comprises 100%, by weight, fly ash.
16. A concrete mix comprising:
    (a) sand;
    (b) cement; and
    (c) an aggregate comprising:
       (i) a product of heating, at a temperature of at least 1090° C. in an oxidizing atmosphere, a raw material mixture including a sludge component and an ash component; said raw material mixture comprising at least 66% by weight, based on dry weight, sludge component; and at least 20%, by weight, based on dry weight, ash component; a ratio of dry weight sludge to ash component being within a range of 2/1 to 4/1; said ash component comprising at least 82%, by weight, fly ash; and, said sludge comprising paper mill or pulp mill sludge.

17. A concrete mix according to claim 16 wherein:

(a) said sludge component comprises paper mill sludge.

18. A concrete mix according to claim 17 wherein:

(a) said sludge component is results from a sludge having a moisture content of at least 50%.

19. A concrete mix according to claim 18 wherein said ash component comprises a mixture of coal combustion fly ash and sanitary waste ash.

* * * * *